April 2, 1963      F. A. TARSON      3,083,458
SPAGHETTI FORK
Filed Oct. 22, 1962
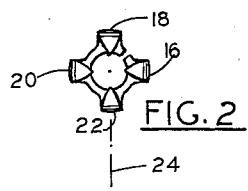
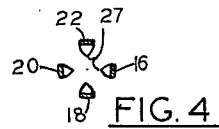
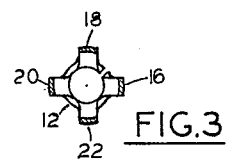
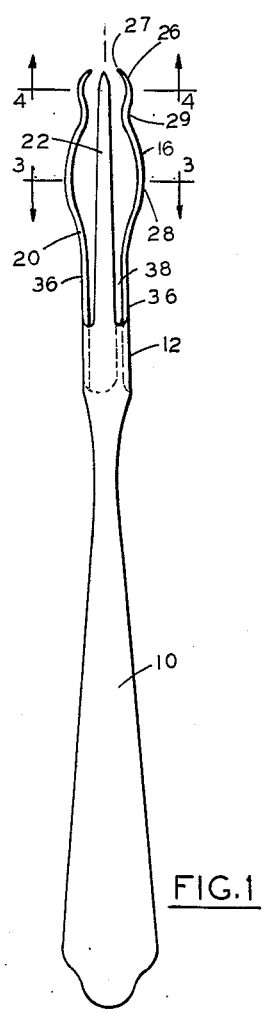
*INVENTOR.*
FRANK A. TARSON
BY
ATTORNEY

United States Patent Office 3,083,458
Patented Apr. 2, 1963

3,083,458
SPAGHETTI FORK
Frank A. Tarson, 650 Burnet Ave., Syracuse, N.Y.
Filed Oct. 22, 1962, Ser. No. 231,898
2 Claims. (Cl. 30—322)

This invention relates to a fork for use in eating spaghetti, small meat balls served therewith, and olives, cherries, or other small round delicacies such as are included with hors d'oeuvres.

In eating spaghetti of the long string variety, it has been the practice to wind up a number of strings upon a fork, having tines disposed in a common plane. To hold the spaghetti from slipping off the ends of the tines during the winding up of the strings, it is the usual practice to rotate the fork with the tine ends disposed within the concave side of a spoon, the operation requiring the simultaneous use of both hands. The uneven winding effect of a fork composed of tines lying in a flat plane, and the lack of any structure tending to prevent the sliding of the spaghetti turns from the end of the fork has resulted in the operation requiring the skilled manipulation of a common fork in combination with a spoon suitably held as indicated.

The use of a plain fork, all the tines of which are disposed substantially in a common plane, for picking up small spherical meat balls, olives, cherries and other ovoid or spherical objects capable of being speared, has presented difficulties, by reason of the inability of the operator to prevent the rounded objects from rolling, during the attempted spearing operation.

The present invention is directed toward a fork, the tines of which may be four or more in number, and which are disposed symmetrically about the end in an open end cage like construction, and which tines extend generally parallel with the fork handle. The fork handle may be flat and extend away from the tines in a direction closely adjacent to the common axis about which the tines are disposed, or the handle may be round and coaxial with such axis. The tines themselves have somewhat inwardly directed pointed tips. Immediately rearwardly of the tips, the tines are curved inwardly for a short distance to provide a cage like circumference of reduced diameter. Immediately to the rear of such inward curvature, the tines are convexly curved to provide a barrel like outline, over the mid portion thereof to facilitate rapid reeling of spaghetti upon the fork, with a minimum number of rotations thereof, such spaghetti being retained upon the mid portion, by the inwardly bent curvature of each of the tines, adjacent the inwardly directed tips.

The reeling is effected at a uniform velocity, and minimizes the tendency of the final ends of the spaghetti strings to whip, and spatter spaghetti sauce.

The tip ends, all lying in a common plane transverse of the axis about which the tines are symmetrically disposed, provides a fork which when moved substantially vertically downward upon a spherical or ovoid condiment, prevents the latter from rolling, while applying sufficient pressure to puncture, and secure the condiment to the tine ends of the fork for the eating thereof.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of the fork;
FIGURE 2 is an end view;
FIGURE 3 is a sectional view taken substantially on the line 3—3 of FIGURE 1; and
FIGURE 4 is a sectional view taken substantially on the line 4—4 of FIGURE 1.

Referring to the drawings, the fork shown, comprises a flat handle 10, the shank of which may be rolled up into a circular tubular sleeve like portion 12. From such tubular sleeve like portion extends, in the form shown, four tines 16, 18, 20 and 22, symmetrically disposed about a central axis 24. Each tine has a somewhat pointed end tip 27 which with the pointed ends of each of the other tines are disposed in a common plane transverse to the fork axis 24. Each tine extends inwardly as at 26 immediately adjacent the pointed end 27. The central portion of each tine is curved outwardly as at 28 in a convex manner, the four tines in the central area serving to provide a reel like cage of generally barrel like outline, and intermediate the central portion 28 and the inclined tine end portions 26 of each of the tines, is an inwardly curved concave like portion 29 adapted to provide a short length axially of the fork wherein the cage like reel is of reduced diameter. The shank end of the tines may extend generally parallel as at 36. Each tine may be of gradually diminishing width from shank to the end tip portions, to provide intermediate slots 38 between the tines of gradually increasing width. Such slots of gradually increasing width permit the inter-tine spaces to be readily cleaned, and facilitates sliding of spaghetti from the end of the fork when the fork with a proper amount of spaghetti wound upon the tines thereof, is inserted into the mouth for eating purposes.

It will be seen from the construction set forth, that upon winding long strings of spaghetti upon the fork tines by rotation thereof, some of the strings will be wound in the region of reduced diameter, and will form a bulwark tending to prevent the dislocation of coils of spaghetti wound upon the barrel portion, from sliding from the end of the fork, except upon the actual eating of the spaghetti when inserted into the mouth. It will also be apparent that such effect, that is the reduction of any tendency of the spaghetti to prematurely slide off the ends of the tines during the rolling up of long strings thereof may be prevented by the operator initially imprisoning a small meat ball, olive, or other delicacy upon the end of the fork, the same, having an overall diameter such as to form a shoulder against slippage of spaghetti from the ends of the tines during the wind up.

While for illustrative purposes the handle and tines are shown in such a manner as to permit the fork to be formed from flat sheet metal stock, it will be apparent that the handle may be variously formed, and the tines extend from a continuous circular ferrule like portion joined to the handle by any suitable means, it being understood that the means employed for securing the symmetrically disposed tines to the handle structure may take a variety of forms.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:
1. A fork for eating spaghetti comprising a handle having a circular shank, and at least three tines extend- ing from said shank of like configuration, and disposed at equal angles from one another and like spacing from a common axis, of said circular shank, each of said tines terminating with a short slightly inbent pointed end portion, a mid convex section, and an intermediate concave section between the mid section and end portions, said end portions terminating in a common plane transverse to said axis and being equally spaced and disposed on a circle.

2. A fork for eating spaghetti comprising a handle having a circular shank, and four tines extending from said shank of like configuration, and disposed at equal angles from one another and like spacing from a common axis, of said circular shank, each of said tines terminating with a short slightly inbent pointed end portion, a mid convex section, and an intermediate concave section betweeen the mid section and end portions, said end portions terminating in a common plane transverse to said axis and being equally spaced and disposed on a circle.

References Cited in the file of this patent

UNITED STATES PATENTS

| | | |
|---|---|---|
| 135,975 | Draper | Feb. 18, 1873 |
| 914,060 | Menkin | Mar. 2, 1909 |
| 2,720,699 | Boruvka | Oct. 18, 1955 |

FOREIGN PATENTS

| | | |
|---|---|---|
| 8,769 | Great Britain | 1899 |